(No Model.)

R. M. JOHNSON.
CHAIN HOOK.

No. 441,490.

Patented Nov. 25, 1890.

WITNESSES:
L. Douville,
A. P. Jennings.

INVENTOR
Robert M. Johnson.
BY
ATTORNEY.

UNITED STATES PATENT OFFICE.

ROBERT M. JOHNSON, OF PHILADELPHIA, PENNSYLVANIA.

CHAIN-HOOK.

SPECIFICATION forming part of Letters Patent No. 441,490, dated November 25, 1890.

Application filed July 16, 1890. Serial No. 358,892. (No model.)

*To all whom it may concern:*

Be it known that I, ROBERT M. JOHNSON, a citizen of the United States, residing in the city and county of Philadelphia, State of Pennsylvania, have invented a new and useful Improvement in Chain-Hooks, which improvement is fully set forth in the following specification and accompanying drawings.

My invention relates to improvements in chain or tug hooks; and it consists, first, of a shank with a hook formed of round metal and having its tongue end flattened, so as to provide a suitable wall for an opening therein, and, second, of the combination of parts herein set forth.

Figure 1:
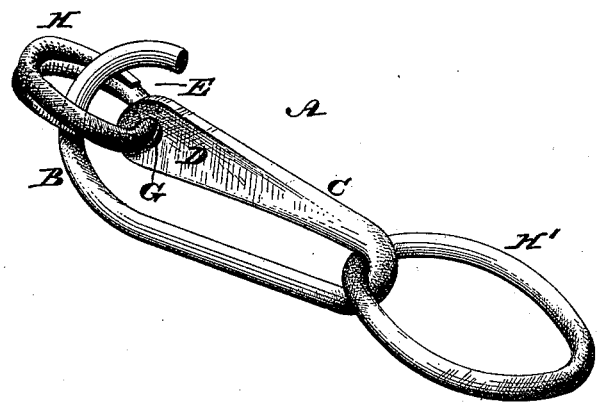
Figure 2:
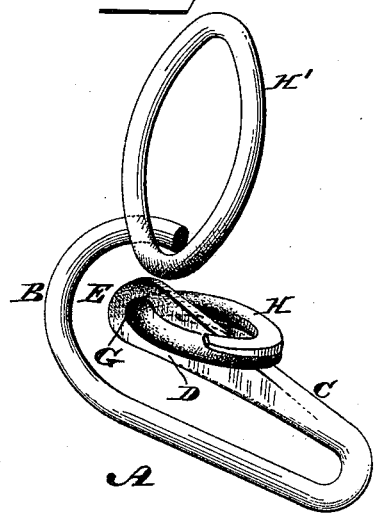

Figures 1 and 2 represent perspective views of a chain or tug hook embodying my invention.

Similar letters of reference indicate corresponding parts in the two figures.

Referring to the drawings, A designates a hook formed of wrought metal and having a rounded shank end B and a bent tongue C, which latter has a flattened portion D, with its end at a sufficient distance from the shank end B to form a throat or passage E, extending to the bent end of the tongue, so as to permit the hook end to be inserted into a link of a chain, or vice versa, and the link to be drawn or moved to the inner end of the passage or throat, as shown in Fig. 1.

In an opening G, formed in the flattened tongue, is inserted a ring or link H, which, when the chain-ring H' is attached, is passed over the shank end B, thereby preventing the accidental displacement of the chain from the shank, or vice versa. (See Fig. 1.) By flattening the tongue an opening of larger diameter may be formed for the insertion of the link H and stronger walls provided for the said opening, thus also permitting the use of a ring of larger diameter than if the said portion of the tongue remained similar in form to the rounded shank end. The flattened sides are substantially in the plane of the shank, so that one side of the link readily passes over the said rounded shank end, and, falling, securely closes the open end of the hook entire, whereby the mere slackening of the chain will not cause the hook and chain to fall apart. As is readily seen, the elongation of the tongue portion of the hook provides a lengthened throat, which, allowing a greater play of the parts on each other before the link reaches the rounded end of the tongue, also assists in preventing separation of the chain and hook. By slackening the chain and moving the link so as to leave the throat or passage E open the chain may readily be separated from the hook, or vice versa, as desired.

Having thus described my invention, what I claim as new, and desire to secure by Letters Patent, is—

1. A trace chain or tug hook having a flattened tongue, a shank, and a hook, the hook being bent over the end of the tongue, forming a throat with said tongue, and a suitable fastening device carried by said tongue and adapted to close the throat, substantially as described.

2. The combination of a hook having a flattened tongue with an opening therein, and a shank end extending partially over said tongue, and a ring in said opening of the flattened tongue adapted to embrace the said shank end and close the throat between the same and the tongue end, substantially as described.

ROBERT M. JOHNSON.

Witnesses:
 BENJ. DEACON,
 THOS. W. PEPPER.